(12) United States Patent
Zhan et al.

(10) Patent No.: US 8,169,322 B1
(45) Date of Patent: May 1, 2012

(54) LOW PROFILE METAL-SURFACE MOUNTED RFID TAG ANTENNA

(75) Inventors: Sanyi Zhan, Ames, IA (US); Robert J. Weber, Boone, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 535 days.

(21) Appl. No.: 12/266,913

(22) Filed: Nov. 7, 2008

(51) Int. Cl.
G08B 13/14 (2006.01)

(52) U.S. Cl. ............ 340/572.7; 340/539.1; 340/10.1

(58) Field of Classification Search .... 340/572.1–572.9, 340/539.1, 568.1, 10.1, 10.42, 10.51
See application file for complete search history.

(56) References Cited

U.S. PATENT DOCUMENTS

| | | | |
|---|---|---|---|
| 4,379,296 A * | 4/1983 | Farrar et al. | 343/700 MS |
| 4,873,529 A | 10/1989 | Gibson | |
| 5,307,818 A * | 5/1994 | Segalowitz | 600/509 |
| 5,663,869 A * | 9/1997 | Vinciarelli et al. | 361/707 |
| 6,016,099 A * | 1/2000 | Campman | 340/321 |
| 6,278,369 B2 | 8/2001 | Smith et al. | |
| 6,278,413 B1 | 8/2001 | Hugh et al. | |
| 6,329,915 B1 | 12/2001 | Brady et al. | |
| 6,486,783 B1 | 11/2002 | Hausladen et al. | |
| 6,535,167 B2 * | 3/2003 | Masuda et al. | 343/700 MS |
| 6,703,935 B1 | 3/2004 | Chung et al. | |
| 6,759,735 B2 * | 7/2004 | Omura et al. | 257/678 |
| 6,914,562 B2 | 7/2005 | Forster | |
| 7,057,562 B2 | 6/2006 | Forster et al. | |
| 7,088,293 B2 * | 8/2006 | Imaizumi et al. | 343/702 |
| 7,126,479 B2 | 10/2006 | Claessens et al. | |
| 7,388,504 B2 | 6/2008 | Mess | |
| 7,612,676 B2 * | 11/2009 | Yuen et al. | 340/572.7 |
| 7,868,841 B2 * | 1/2011 | Pettus | 343/793 |
| 2008/0314993 A1 * | 12/2008 | Baba et al. | 235/492 |
| 2010/0283584 A1 * | 11/2010 | McAllister | 340/10.1 |

OTHER PUBLICATIONS

Wonkyu Choi, Nov. 21, 2005.*
Wonkyu Choi et al. ETRI journal, Apr. 2006.*
Choi, Wonkyu et al., "An RFID Tag Using a Planar Inverted-F Antenna Capable of Being Stuck to Metallic Objects", ETRI Journal, vol. 28, No. 2, Apr. 2006, pp. 216-218.
Hirvonen, M., et al. "Planar Inverted-F Antenna for Radio Frequency Identification", Electronics Letters, Jul. 8, 2004, vol. 40, No. 14, pp. 848-850.
Kwon, H., et al., "Compact Slotted Planar Inverted-F RFID Tag Mountable on Metallic Objects", Electronics Letters, Nov. 24, 2005, vol. 41, No. 24, pp. 1308-1310.

(Continued)

Primary Examiner — Daniel Previl
(74) Attorney, Agent, or Firm — McKee, Voorhees & Sease, P.L.C.

(57) ABSTRACT

A passive RFID tag suitable for attachment to an electrically conductive surface is provided. The passive RFID tag includes a dielectric substrate, an RFID chip for storing data, and an RFID antenna structure operatively connected to the RFID chip wherein the RFID antenna structure comprises a slotted inverted L-shape. A method of manufacturing a passive RFID tag includes forming an antenna structure on a conductive layer, the antenna structure comprising a slotted inverted L-shape. The method further includes operatively connecting an RFID chip with the antenna structure. A method associated with a passive RFID tag includes providing a passive RFID tag. The passive RFID tag includes a dielectric substrate, an RFID chip for storing data, and an RFID antenna structure operatively connected to the RFID chip wherein the RFID antenna structure comprises a slotted inverted L-shape. The method further includes operatively connecting the passive RFID tag to a conductive surface.

17 Claims, 8 Drawing Sheets

OTHER PUBLICATIONS

Son, H.-W. et al., "Design of Wideband RFID Tag Antenna for Metallic Surfaces" Electronics Letters, Mar. 2, 2006, vol. 42, No. 5, pp. 263-265.

Ukkonen, Leens et al., "Planar Wire-Type Inverted-F RFID Tag Antenna Mountable on Metallic Objects", 0-7803-8302-8/04 2004 IEEE International Symposium (Monterey, CA), vol. 1, pp. 101-104.

* cited by examiner

LOW PROFILE METAL-SURFACE MOUNTED RFID TAG ANTENNA

FIELD OF THE INVENTION

The present invention relates to RFID tags, and more particularly to a low profile metal-surface mounted antenna suitable for use in RFID tags.

BACKGROUND OF THE INVENTION

As one of the fastest growing sectors of automatic identification procedures (Auto-ID), contactless radio frequency identification (RFID) technology has been broadly applied to enterprise supply chain management and other applications. A typical RFID system includes a RFID reader or interrogator, a RFID chip and a RFID tag antenna. The RFID chip and the RFID tag antenna are typically packaged together to form an RFID tag. The RFID chip stores data which often includes identifying information. The data may be retrieved by a RFID reader through the RFID tag antenna.

Figure 1:
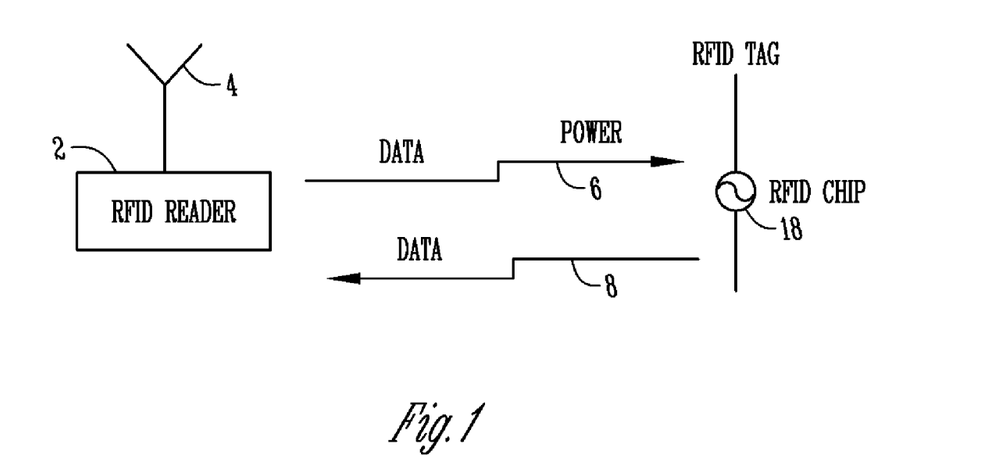
FIG. 1 is a diagram illustrating a passive RFID system.

A low cost passive RFID transponder or RFID tag does not include any internal power supply. In such a system, the RFID reader sends both information and power to the RFID tag. The RFID tag receives the power and demodulates the data from the reader. The data stored in the RFID chip varies the impedance of the RFID tag antenna so the backscattering wave can be modulated. Then the reader retrieves the data sent by the tag by demodulation. FIG. 1 shows a passive RFID system. In such a system 1, an RFID reader 2 with antenna 4 communicates data and power 6 to an RFID tag having an RFID chip 18. Data 8 is then communicated from the RFID chip 18 to the RFID reader 2.

Figure 2:
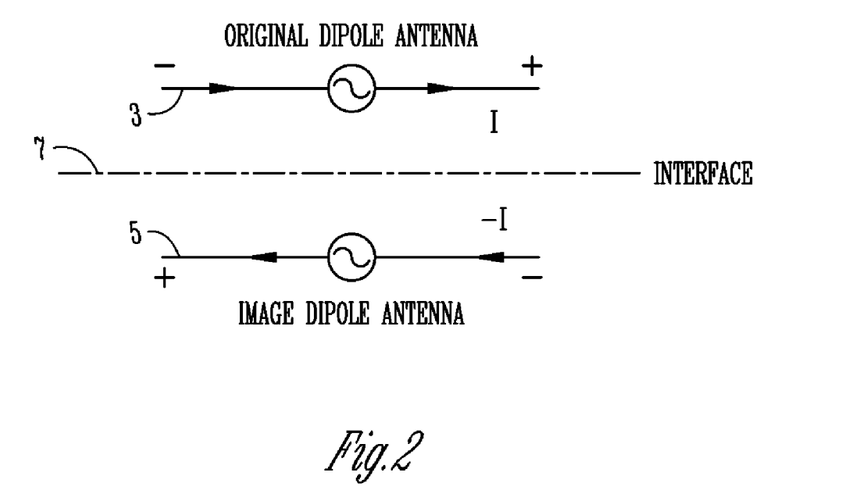
FIG. 2 is a diagram illustrating why a dipole type RFID tag can not be read with the image dipole below the metal surface has an opposite current from the original dipole.

One of the most significant challenges is that the RFID tag can not be read when using the commonly used dipole antennas when the tags are attached to a conductive surface. The reason why the dipole type RFID tag can not be read is explained in FIG. 2, which illustrates that the image dipole 5 below the metal surface 7 has an opposite current from the original dipole 3. If the space between the dipole and its image is very small (much less than one wavelength), then the total effective current is equal to zero. Thus the total radiated (or received) field is negligible and therefore, the RFID tag is unable to capture data and power from the reader. This is a significant problem given that in many commercial applications it is desirable to apply the RFID tag to a metal or other type of conductive surface.

Based on the literature, a few metal surface mountable RFID tag antennas have been reported. L. Ukkonen, D. Engels, L. Sydanheimo, M. Kivikoski, "Planar wire-type inverted—F RFID tag antenna mountable on metallic objects", 2004 IEEE AP-S International Symposium (Monterey, Calif.), Jun. 20-26, 2004, vol. 1, pp. 101-104, proposes a 3-layer antenna design which has a horizontal size 10 cm by 8 cm, thickness 6.455 mm, which has a radiation efficiency 0.6753 and directivity 4.347. Based on this performance, the area and the height are too large. The RFID tag antenna is a multilayer structure built on Teflon, thus making it more expensive to manufacture.

M. Hirvonen, P. Pursula, K. Jaakkola and K. Laukkanen, "Planar inverted-F antenna for radio frequency identification", Electronic Letters, July 2004, vol. 40, No. 14, pp. 848-850 proposes a two-layer structure by using a traditional planar inverted-F antenna. The resulting antenna has a thickness 3 mm and width 45 mm. The deficiency is that the antenna needs two ground connections. The antenna uses Teflon as the substrate. The two shorting plates to ground are in opposite direction, which increases the cost of the fabrication. The best performance for the reading range is about 5.1 m. For this performance, the resulting antenna is still too wide and too thick.

The prior art also provides for various antennas which are mountable on metal and which use inverted-F antenna structures. Even where such antennas demonstrate reasonable reading ranges, such antennas require relatively expensive substrate material (such as Teflon), complicated fabrication processes, thick substrates (3 mm~4 mm) and result in RFID tag antennas which occupy relatively large areas. Examples of such antennas include W. Choi, H. W. Son, etc. "An RFID tag using a planar inverted-F antenna capable of being stuck to metallic objects", ETRI Journal, April, 2006, Vol 28, No. 2, pp. 216-218; H.-W. Son, G.-Y. Choi, and C.-S. Pyo, "Design of wideband RFID tag antenna for metallic surfaces", *Electronic Letters*, March 2006, Vol. 42, No. 5, pp. 263-265; J.-S. Kuo, K. L. Wong, "Dual-frequency operation of a planar inverted-L antenna with tapered patch width", *Microwave Opt. Technol. Letters*, Vol. 28, No. 2, January 2001, pp. 126-127.

Another example of an RFID tag antenna is from Kansas University. The RFID tag antenna uses about 60 mil thick high density polyethylene, an antenna size of 4 inch by 5.5 inch and can achieve 20 feet reading range. Such an antenna may still be too large in size and more expensive then desired.

U.S. Pat. No. 6,329,915 to Brady et al. discloses a method by using high dielectric constant material to reduce the size of the antenna and the distance between the antenna and the conducting surface. The cost may be relatively high and the reading range relatively low due to the high dielectric material.

U.S. Pat. No. 7,126,479 to Claessens et al. discloses a RFID tag which is attachable to a metal container by using a microstrip antenna. The microstrip antenna has a length of half wavelength, which is larger than what may be desired.

U.S. Pat. No. 6,278,369 to Smith et al. discloses an inverted-F antenna which may be applied to a conductive surface; however, the antenna needs two ground connections and a very thick substrate. U.S. Pat. No. 6,914,562 to Forster discloses a surface insensitive antenna structure.

Thus, various attempts have been made to provide metal surface mountable RFID tag antennas. However, such attempts have resulted in designs which are too large, too expensive to fabricate, too limited with respect to reading range, or in designs that otherwise adversely affect the performance of the RFID tag or its commercial viability. What is needed is an improved metal surface mountable RFID tags.

Therefore, it is a primary object, feature, or advantage of the present invention to improve over the state of the art.

It is a further object, feature, or advantage of the present invention to provide an RFID tag which may be applied to metal or other types of conductive surfaces.

It is a still further object, feature, or advantage of the present invention to provide an RFID tag which is economical to manufacture and use.

One or more of these and/or other objects, features, or advantages of the present invention will be clear from the specification and claims that follow.

BRIEF SUMMARY OF THE INVENTION

The present invention relates to an RFID tag mountable on metal. The RFID tag uses a slotted inverted-L antenna. The antenna provides an approximately omnidirectional radiation pattern and sufficient bandwidth in the 900 MHz ISM (902~928 MHz) frequency band. The antenna may have a compact size, a low profile, and good reading range in all directions. The antenna may be built on an inexpensive dielectric layer, such as foam. The fabrication process may use silver printing and folding to limit production costs.

According to one aspect of the present invention, a passive RFID tag suitable for attachment to an electrically conductive surface is provided. The passive RFID tag includes a dielectric substrate, an RFID chip for storing data, and an RFID antenna structure operatively connected to the RFID chip wherein the RFID antenna structure comprises a slotted inverted L-shape.

According to another aspect of the present invention, a method of manufacturing a passive RFID tag is provided. The method includes forming an antenna structure on a conductive layer, the antenna structure comprising a slotted inverted L-shape. The method further includes operatively connecting an RFID chip with the antenna structure.

According to another aspect of the present invention, a method associated with a passive RFID tag is provided. The method includes providing a passive RFID tag. The passive RFID tag includes a dielectric substrate, an RFID chip for storing data, and an RFID antenna structure operatively connected to the RFID chip wherein the RFID antenna structure comprises a slotted inverted L-shape. The method further includes operatively connecting the passive RFID tag to a conductive surface.

DETAILED DESCRIPTION OF THE PREFERRED EMBODIMENT

The present invention provides an RFID tag which is suitable for use on a metal or other type of conductive surface and which is economical and convenient to manufacture. By using a slotted inverted-L structure, the present invention provides a solution to this long unsolved problem with verifiable performance.

According to one aspect of the present invention a high efficiency metal-surface mounted radio frequency identification (RFID) tag antenna is provided which is operated in the ultra high frequency (UHF) band. The antenna has a slotted inverted-L shape. As used herein, the term "structure" when used to describe an antenna, describes its geometrical configuration. Thus, the antenna structure may be described as having a slotted inverted L-shape. The antenna allows for a compact size, low profile, and excellent reading range. The antenna is built on foam with 64 mils thickness and tested by a Symbol RFID handheld reader (MC9000-G) with 4 W EIRP. The reading range is more than 20 feet. Commercially, the radiation patch and ground patch can be easily built on one thin layer by using inexpensive silver printing process. The final antenna may be built by folding the printed metal layer around an inexpensive foam substrate, which demonstrates that it has a very low fabrication cost. By a simulation of 3D electromagnetic simulation software HFSS, the antenna shows a 58 percent radiation efficiency above 64 mils thick foam. It also exhibits an omnidirectional radiation pattern, which shows a directivity of 3 to 4 dBi in all of the elevation planes. Based on a VSWR 2:1 bandwidth standard, the proposed antenna has a bandwidth 30 MHz and broader than the desired Industrial, Scientific and Medical (ISM) frequency band (902~928 MHz).

Figure 3A:
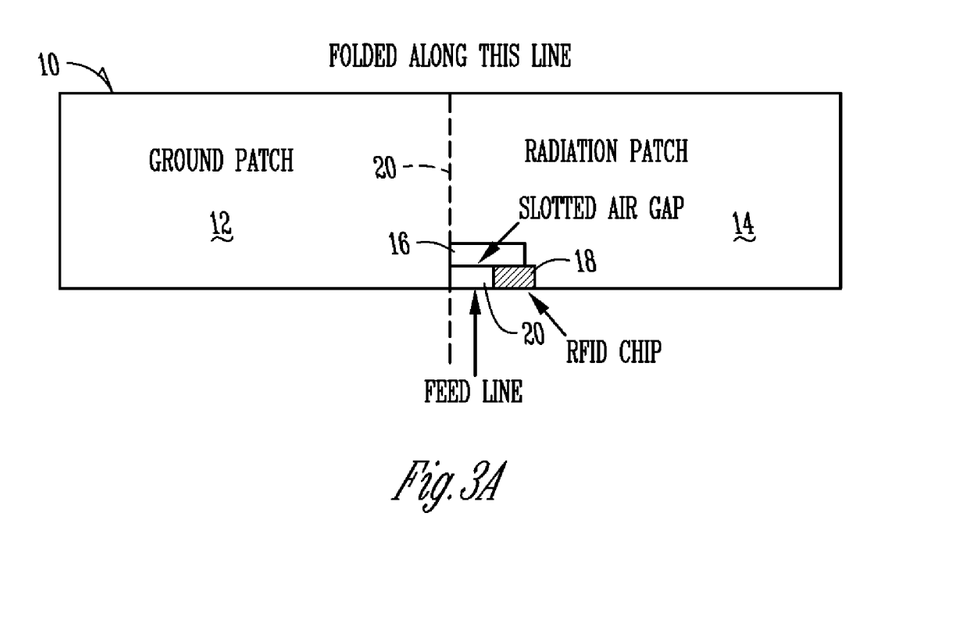
FIG. 3A is a plan view of a slotted inverted-L RFID tag A built on foam
Figure 3B:
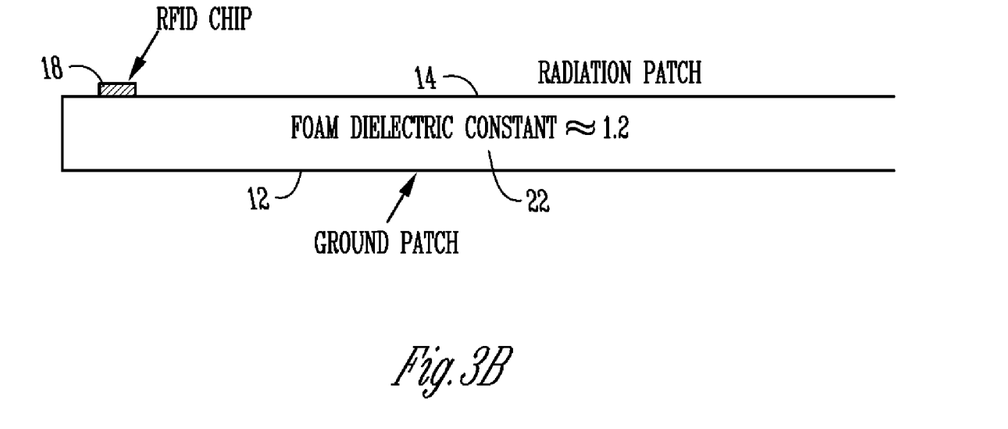
FIG. 3B is a cross section view of the slotted inverted-L RFID tag A built on foam.
Figure 4:
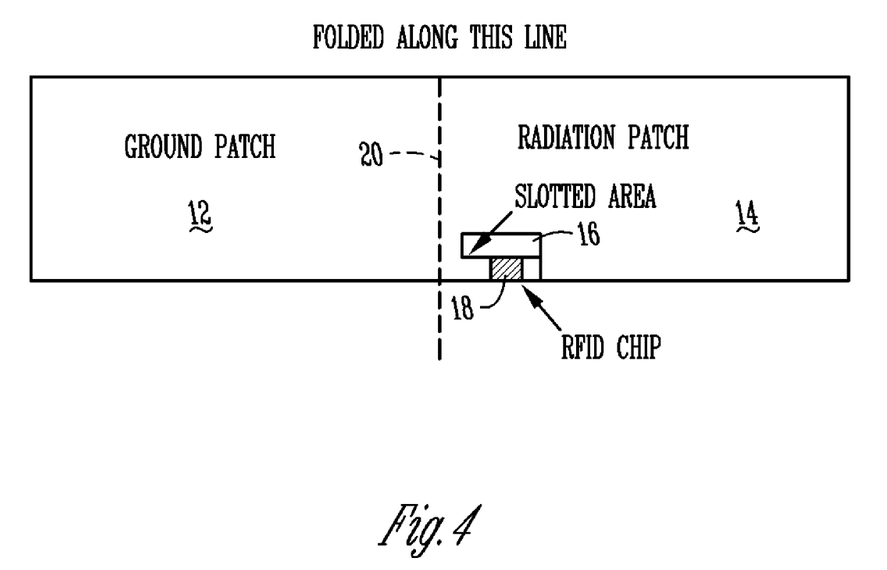
FIG. 4 illustrates a variation of the slotted inverted-L RFID tag antenna, which is folded along a line which is a little farther from the edge of the slotted gap. The feeding line could be extended from the main body of the radiation patch. The structure may have a better reliability.

FIG. 3A to FIG. 6 illustrate one embodiment of the RFID tag antenna of the present invention. FIG. 3A is a plan view and FIG. 3B is a cross section view. As shown in FIG. 3A, an RFID tag 10 has a ground patch 12 and a radiation patch 14. There is a slotted air gap 16 present in the radiation patch. An RFID chip 18 is shown. A feedline 20 is also shown. As shown in FIG. 3B, the RFID tag 10 has a dielectric substrate 22. The ground patch 12 and radiation patch 14 are folded around the dielectric substrate 22. The dielectric substrate 22 may be a thin foam layer. The substrate thickness may vary. Increasing the thickness results in a proportional increase in radiation efficiency. However, it is generally desirable to maintain a low profile for the RFID tag. Thus, there may be some tradeoff depending upon the desired radiation efficiency and the desired profile.

In a preferred embodiment a 64 mils (1.6 mm) thick foam layer with a dielectric constant 1.2 and tangent loss 0.001 is used as the substrate. The antenna is folded across the axis 20 shown in FIG. 3A. The overall horizontal size may be about 2.6 inch by 1.3 inch. The radiation patch 14 and ground patch 12 may be built with a 1.4 mil copper layer. To test a prototype of a resulting RFID tag, a commercially available SYMBOL RFID handheld reader (MC9000-G) with a 4 W EIRP was applied to test the performance of the antenna above a 5 inch by 6 inch copper board. The maximum reading range at horizontal direction is more than 20 feet (6 meters), which is sufficient for most applications. If a higher reading range is desired, the patch size, slotted area and thickness may be adjusted. For this antenna structure, a bigger area and higher substrate height contribute to a larger directivity and radiation efficiency. Overall, a larger reading distance can be achieved. If a smaller or thinner structure is desired, the size and height can be decreased, if a reduced reading range is tolerable. With a 32 mils thick substrate and the same horizontal size, a reading range of 10 feet is achieved. By changing the width and length of the slotted air gap, the RFID tag antenna impedance can be varied and matched to the RFID chip impedance. No extra impedance matching elements are required.

Figure 5A:
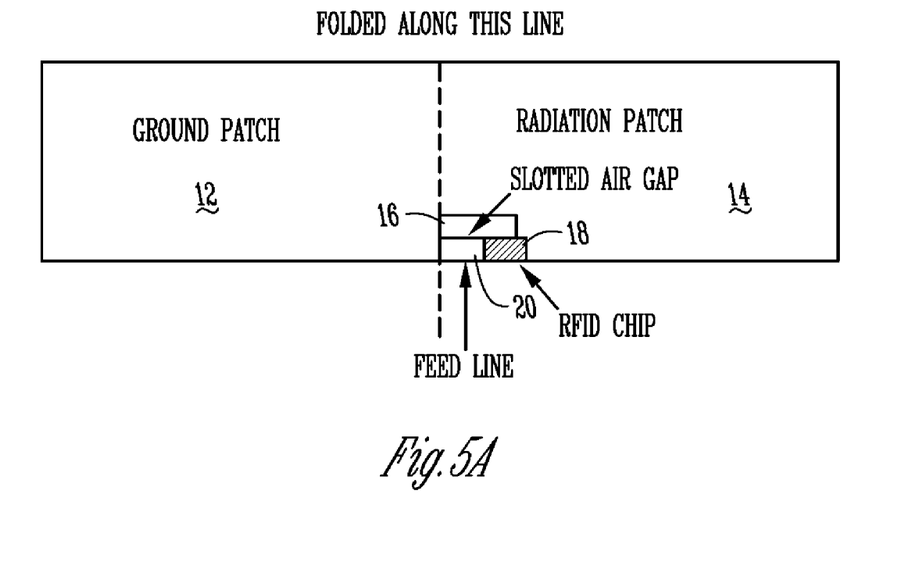
FIG. 5A and FIG. 5B demonstrates the structure built on Rogers 5880. The dielectric constant is 2.2 and tangent loss is 0.0009. The horizontal size for a similar performance (20 feet reading range) is smaller, about 2 inches by 1.2 inch. The thickness is 62 mils.

FIG. 5 illustrates a plan view of a variation of the slotted inverted-L RFID tag antenna which is folded along a line 20 which is further from the edge of the slotted gap 16. The feed line can be extended from the main body of the radiation patch 14. This variation may have better reliability.

Figure 5B:
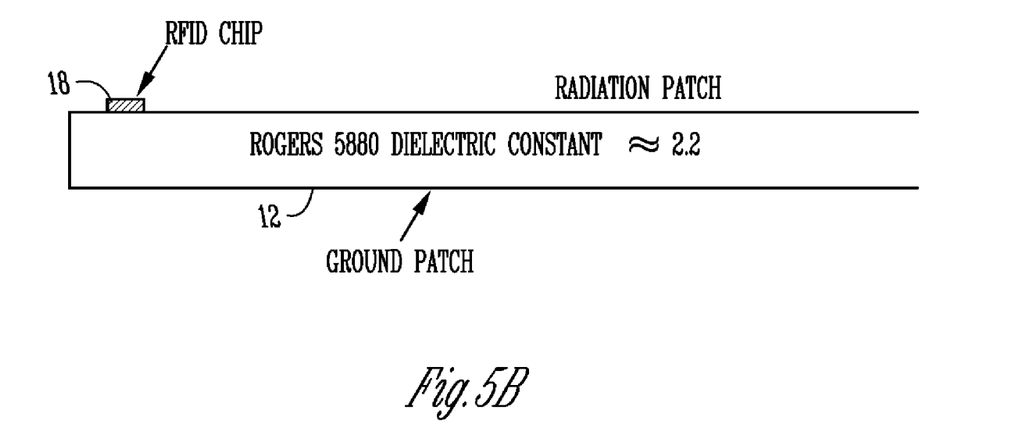

Prototypes were built on inexpensive foam and Rogers 5880. Rogers 5880 is an example of a glass microfiber reinforced PTFE composite which has a manufacturer specified $\in_r$ of 2.2 and tangent loss of 0.0009. The horizontal size for a similar performance (20 feet reading range) is smaller than when the dielectric substrate is foam, about 2 inches by 1.2 inches. The thickness is 62 mils. FIGS. 5A and 5B illustrate an RFID tag where Rogers 5880 is used as the dielectric substrate. Of course, other types of materials may be used with other dielectric constants, including materials with dielectric constants greater than 1.2, between 1.2 and 2.0, and greater than 2.0.

Figure 6:
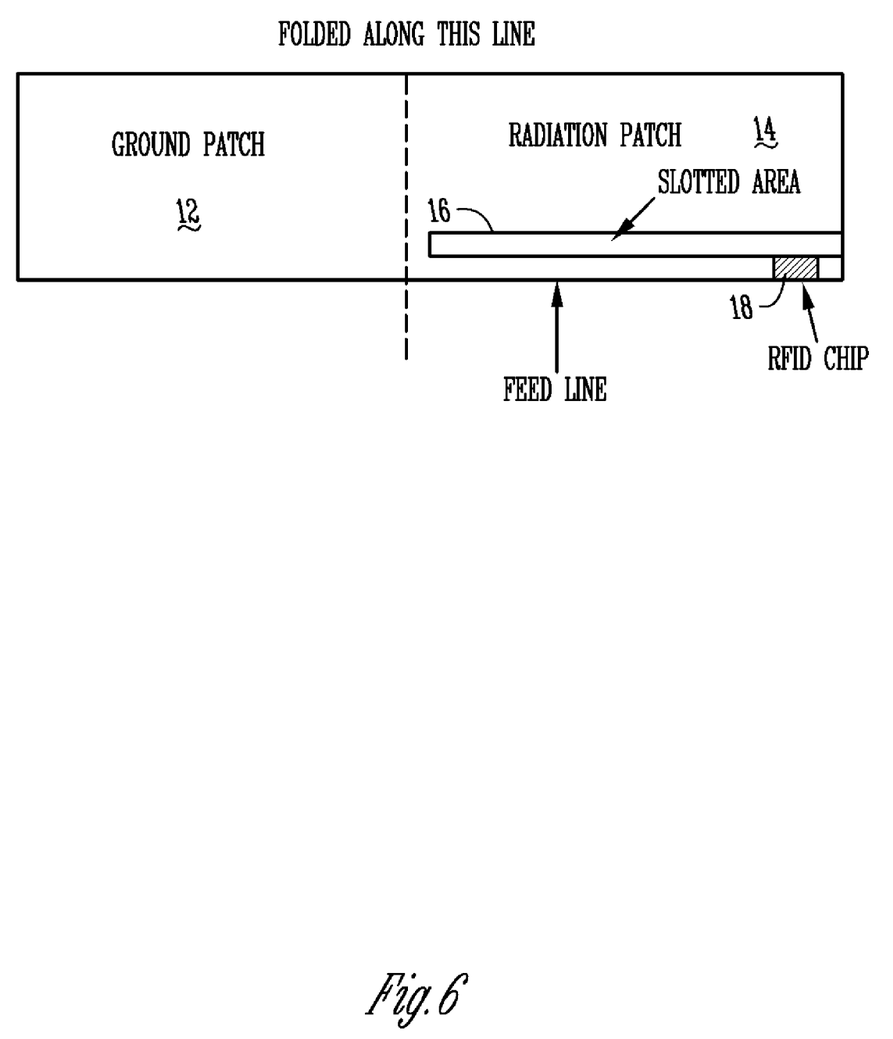
FIG. 6 is a plan view of a slotted inverted-L RFID tag E with a longer slot using Rogers 5880. There is a longer slot on the radiation patch.

FIG. 6 illustrates a plan view of another embodiment of the present invention. In FIG. 6, the slot 16 is longer on the radiation patch 14.

By using a silver printing process (or other thick film conduction pattern printing), the radiation patch and ground patch may be easily built on one thin layer. Then a folding process may be applied to fold the structure on a dielectric substrate such as, but not limited to foam. Foam is a very inexpensive substrate which is readily available. The silver printing is a mature and inexpensive technology in industry. Thus, with appropriate choices in construction materials, the overall cost per unit can be much lower than commercially available RFID tags. The best known commercially available metal surface mounted RFID tag is about 1 inch wide, 5.8 inch long and 200 mil thickness. The reading range is about 12 feet. Such an overall size is 5.4 times larger than an embodiment of the present invention where foam is used. Moreover, the reading range of the commercially available metal surface mounted RFID tag would be only about ⅔ of the invention. The cost of the commercially available metal surface mounted RFID tag would be approximately twenty times higher than the present invention. Thus, the present invention provides significant advantages in terms of size, reading range, and cost.

When an antenna with a thicker foam structure (64 mil thickness, 2.6 inch by 1.3 inch horizontal size) is placed above a large metal ground surface, the radiation efficiency simulated by HFSS is 58 percent. HFSS is a commercial finite element method solver for electromagnetic structures available from Ansoft Corporation. The analysis further demonstrates that the directivity is 2.6, which is almost two times as large as a common dipole type RFID tag antenna. The antenna has an approximately omnidirectional radiation pattern, which is a significant value for this antenna. When the RFID tag antenna is attached to a large metal surface, from 0 to 180 degrees, the RFID tag should be able to be read at almost equal distance.

TABLE 1

The Simulated Results for the Slotted Inverted-L Antenna built on foam

| | Length/ inch | Width/ inch | Height/ inch | Directivity | Efficiency | Antenna Impedance |
|---|---|---|---|---|---|---|
| Thicker foam | 2.6 | 1.3 | 0.064 | 2.6 | 0.58 | 8 + j85 |
| Thinner foam | 2.6 | 1.3 | 0.032 | 2.6 | 0.28 | 13 + j80 |

Figure 7A:
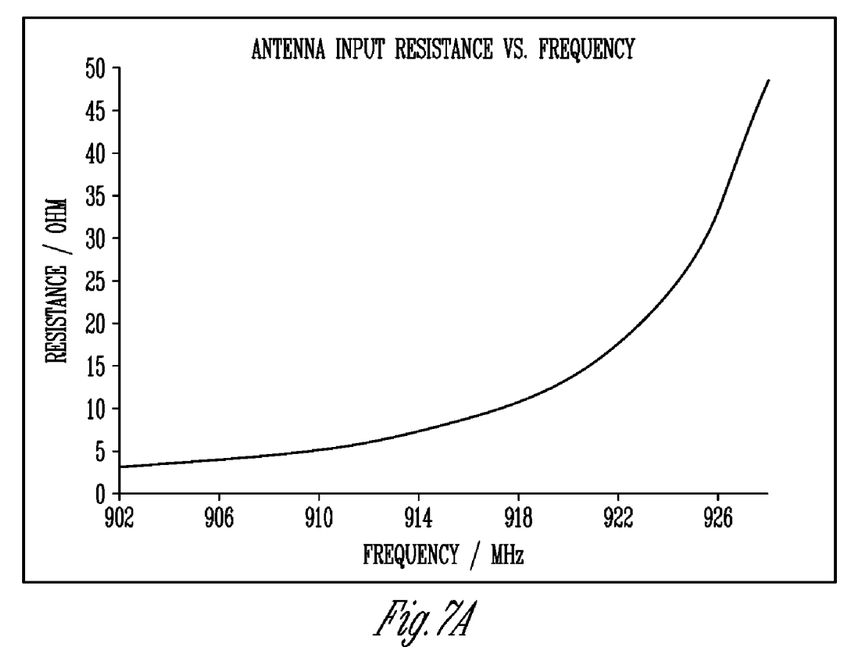
FIG. 7A is a graph illustrating simulated antenna input resistance as a function of frequency in the 900 MHz ISM frequency band.
Figure 7B:
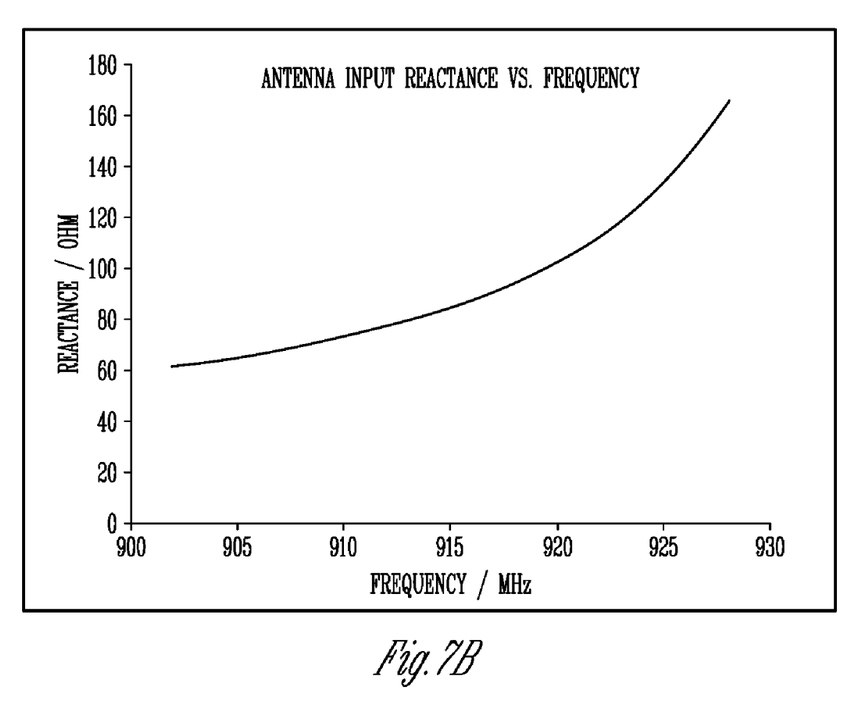
FIG. 7B illustrates a simulated antenna input reactance as a function of frequency in the 900 MHz ISM frequency band.
Figure 8:
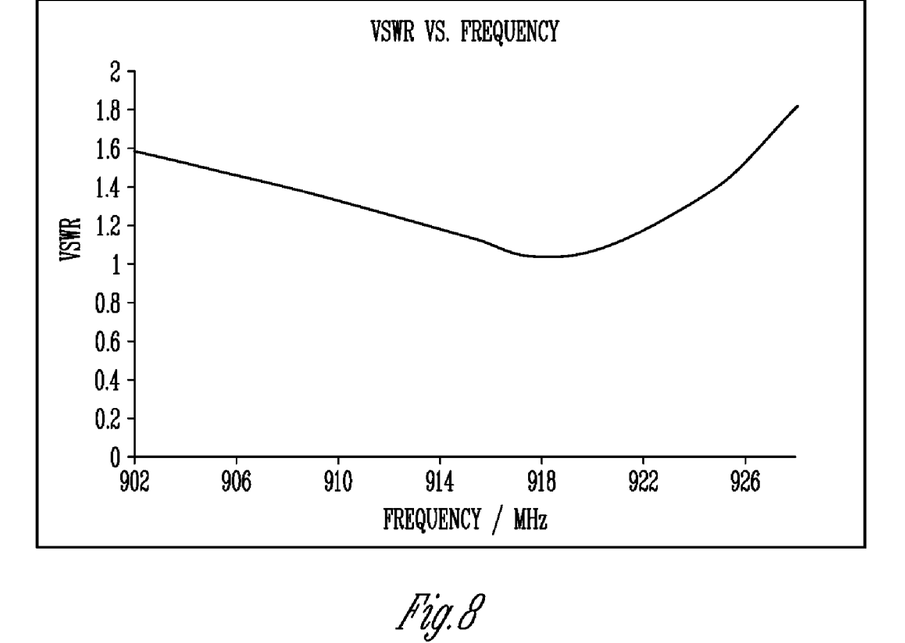
FIG. 8 illustrates a simulated VSWR as a function of function in the 900 MHz ISM frequency band.
Figure 9A:
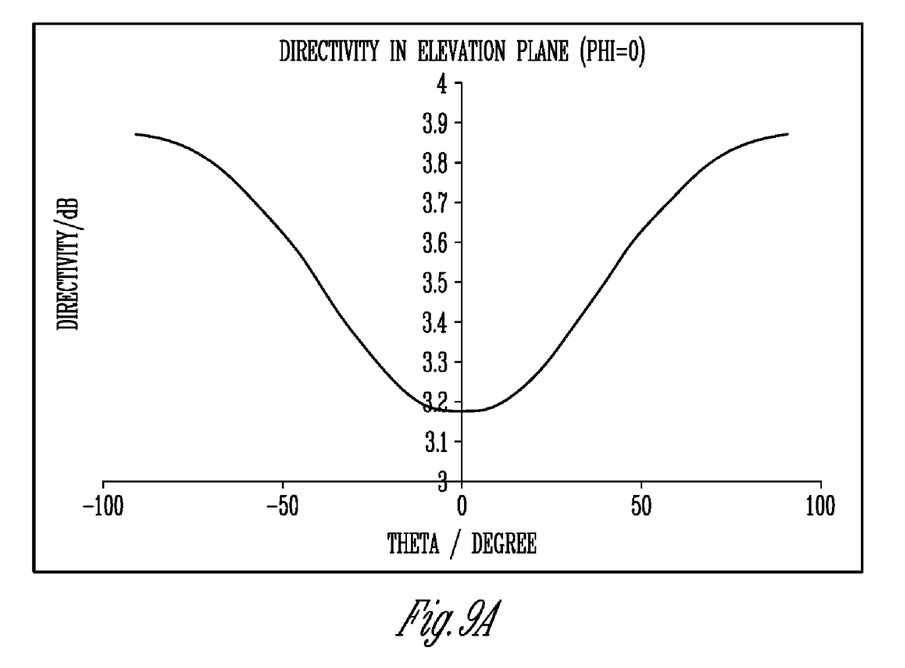
FIG. 9A illustrates simulated directivity pattern in the elevation plane (phi=0 degree).
Figure 9B:
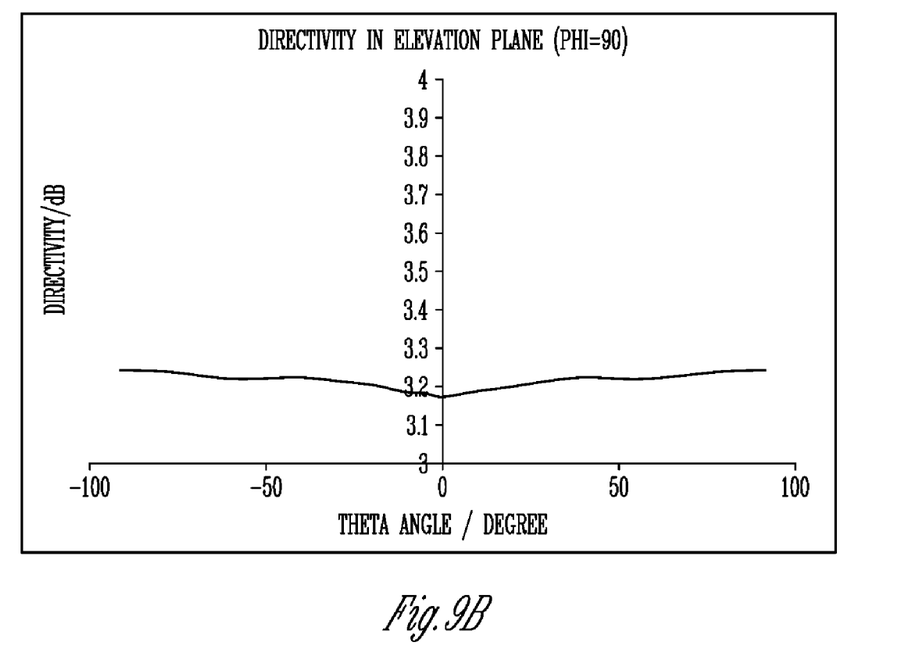
FIG. 9B illustrates simulated directivity pattern in the elevation plane (phi=90 degree).
Figure 9C:
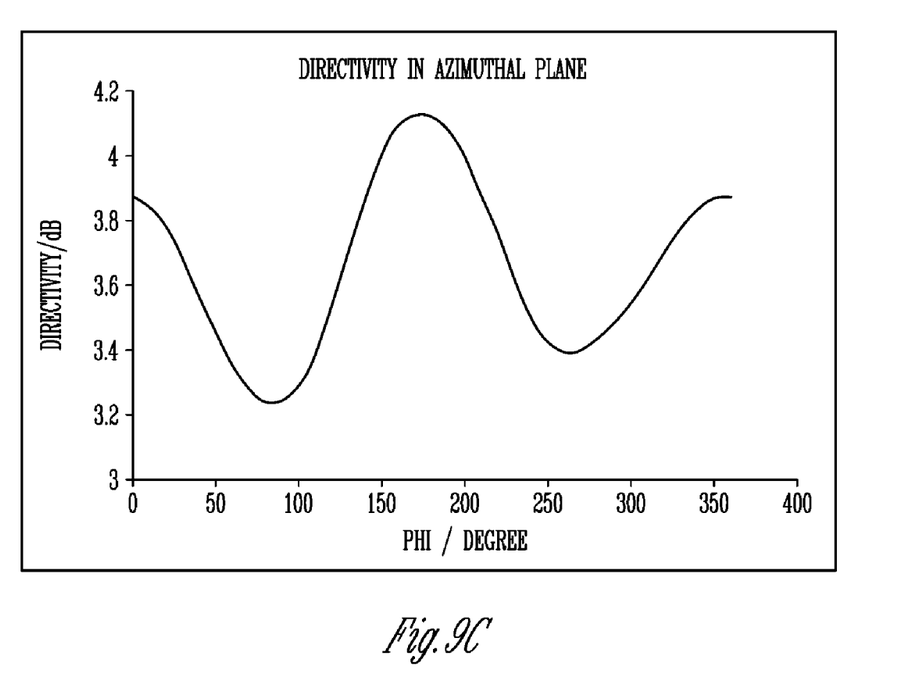
FIG. 9C illustrates simulated directivity pattern in the azimuthal plane (theta=90 degree).

FIG. 7A through FIG. 9C illustrate simulated performance of the antenna. FIG. 7A is a graph illustrating simulated antenna input resistance as a function of frequency in the 900 MHz ISM frequency band. FIG. 7B illustrates a simulated antenna input reactance as a function of frequency in the 900 MHz ISM frequency band. FIG. 8 illustrates a simulated VSWR as a function of function in the 900 MHz ISM frequency band. FIG. 9A illustrates simulated directivity pattern in the elevation plane (phi=0 degree). FIG. 9B illustrates simulated directivity pattern in the elevation plane (phi=90 degree). FIG. 9C illustrates simulated directivity pattern in the azimuthal plane (theta=90 degree).

As discussed throughout, the present invention contemplates numerous embodiments, variations, options, and alternatives. For example, the present invention contemplates that various types of materials may be used for the dielectric substrate and for the conductive layer; there may be variations in the antenna structure; there may be variations in the length and placement of the slot; there may be variations in the size and reading range; and other variations, options, and alternatives. One of ordinary skill in the art will recognize that there are different manners in which these elements can provide to accomplish the present invention. The present invention is intended to cover what is claimed and any equivalents. The specific embodiments used herein are to aid in the understanding of the present invention, and should not be used to limit the scope of the invention in a manner narrower than the claims and their equivalents.

What is claimed is:

1. A passive RFID tag suitable for attachment to an electrically conductive surface or a non-conductive surface, the passive RFID tag comprising:
    a conductive radiation patch with a slotted air gap and a rectangular microstrip line;
    a conductive ground patch electrically connected to the conductive radiation patch and suitable for attachment to the electrically conductive surface or the non-conductive surface;
    a conductive sidewall connecting the conductive radiation patch and the conductive ground patch;
    a dielectric substrate between the conductive radiation patch and the conductive ground patch; and
    a surface mounted RFID chip for storing data, the RFID chip surface mounted on the conductive radiation patch.

2. The passive RFID tag of claim 1 wherein the dielectric substrate having a dielectric constant greater than 1.2.

3. The passive RFID tag of claim 1 wherein the dielectric substrate having a dielectric constant between 1.2 and 2.0.

4. The passive RFID tag of claim 1 wherein the dielectric substrate having a dielectric constant greater than 2.0.

5. The passive RFID tag of claim 1 wherein the dielectric substrate comprises foam.

6. The passive RFID tag of claim 1 wherein the dielectric substrate comprises a PTFE composite.

7. The passive RFID tag of claim 1 wherein the conductive radiation patch and the conductive ground patch are on a metal layer folded around the dielectric substrate.

8. The passive RFID tag of claim 7 wherein the metal layer being copper and wherein the RFID antenna structure being formed by silver printing.

9. The passive RFID antenna tag of claim 1 wherein the conductive sidewall and a RFID antenna radiation path form a slotted inverted L-shape.

10. The passive RFID antenna tag of claim 9 wherein the slotted inverted L-shape having dimensions selected to provide an impedance matching an impedance of the RFID chip.

11. The passive RFID tag antenna of claim 1 wherein the conductive sidewall and a RFID antenna radiation path form a slotted inverted L-shape.

12. The passive RFID tag antenna of claim 1 wherein an RFID antenna radiation path of the passive RFID tag antenna has only one radiating slot.

13. The passive RFID tag antenna of claim 1 wherein the passive RFID tag has a thickness of 62 mils or less.

14. A method of manufacturing a passive RFID tag, the method comprising:
   forming a radiation patch by printing an antenna pattern on a conductive layer;
   folding the conductive layer around a dielectric substrate such that the radiation patch is on a first side of the passive RFID tag and the ground layer is on a second side of the passive RFID tag with the dielectric substrate therebetween and such that a sidewall of the conductive layer connects the radiation patch and the ground layer, with the radiation patch and sidewall forming a slotted inverted L-shape;
   surface mounting an RFID chip on the conductive layer.

15. The method of claim 14 wherein the dielectric substrate comprises foam.

16. The method of claim 14 wherein the printing is silver printing.

17. A passive RFID tag suitable for attachment to an electrically conductive surfaces and non-electrically conductive surfaces, the passive RFID tag comprising:
   a dielectric substrate;
   a conductive layer folded around the dielectric substrate to provide a radiation patch on a first side of the dielectric substrate and a ground patch on an opposite second side of the dielectric substrate and a sidewall connecting the radiation catch and the around patch, the around patch suitable for attachment to electrically conductive surfaces and non-electrically conductive surfaces;
   an RFID chip for storing data, the RFID chip surface mounted to the radiation patch;
   wherein the sidewall and a RFID antenna radiation path form a slotted inverted L-shape.

* * * * *

UNITED STATES PATENT AND TRADEMARK OFFICE
CERTIFICATE OF CORRECTION

PATENT NO.         : 8,169,322 B1
APPLICATION NO.    : 12/266913
DATED              : May 1, 2012
INVENTOR(S)        : Zhan et al.

Page 1 of 1

It is certified that error appears in the above-identified patent and that said Letters Patent is hereby corrected as shown below:

Col. 8, Claim 17, Line 13:
DELETE after radiation "catch and the around patch, the around patch"
ADD after radiation --patch and the ground patch, the ground patch--

Signed and Sealed this
Nineteenth Day of June, 2012

David J. Kappos
*Director of the United States Patent and Trademark Office*